June 26, 1934.   T. L. FAWICK   1,964,566
CLUTCH PLATE
Filed Oct. 29, 1930
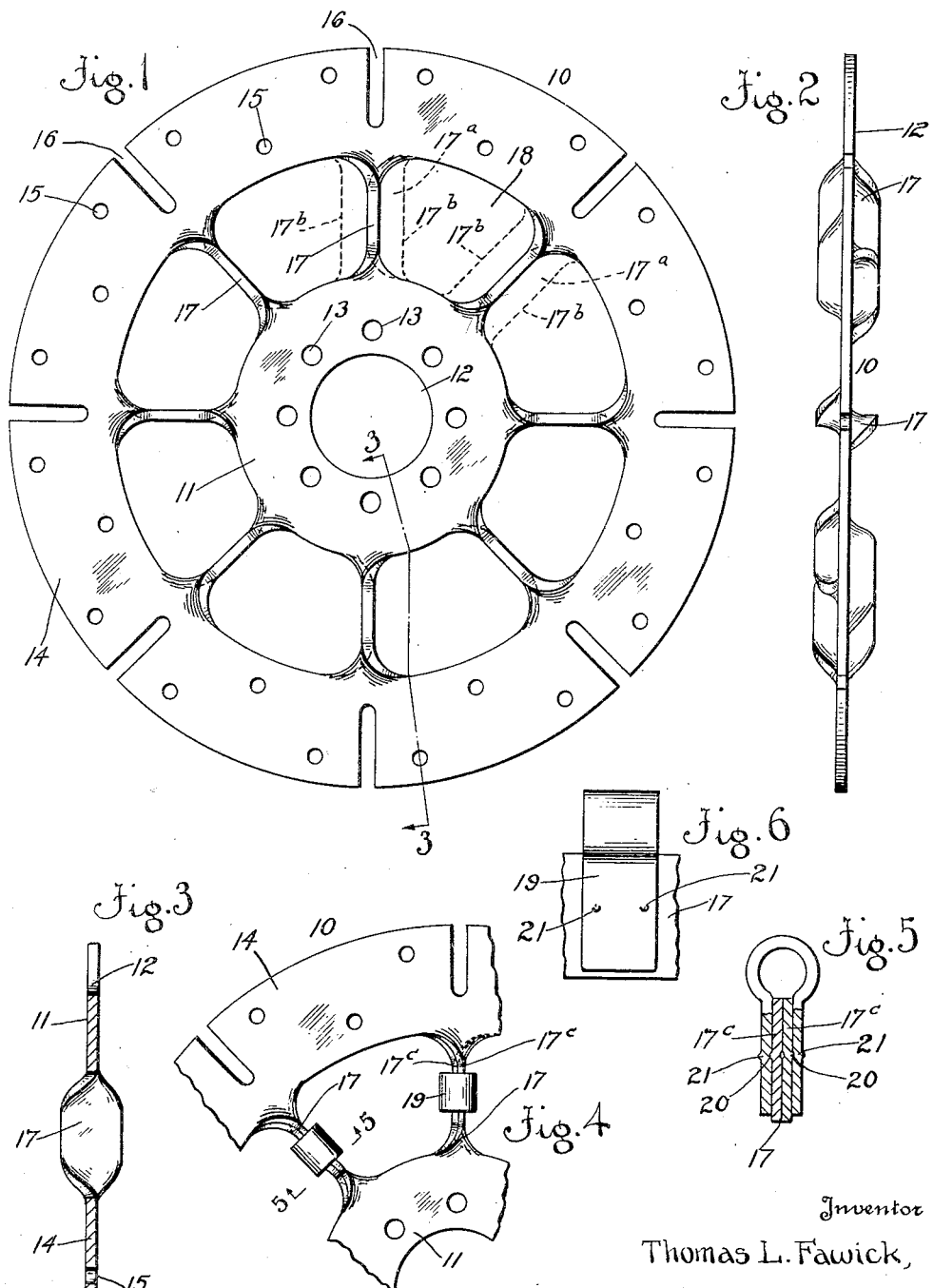
Inventor
Thomas L. Fawick,
By Robert M. Pierson,
Attorney Patented June 26, 1934

1,964,566

UNITED STATES PATENT OFFICE 1,964,566

CLUTCH PLATE

Thomas L. Fawick, Akron, Ohio

Application October 29, 1930, Serial No. 491,963

14 Claims. (Cl. 192—68)

This invention relates to plates or disks such as the driven disk of a friction clutch or any analogous coupling device, and it has for its object to provide torsional flexibility and resiliency in such members in a simpler, less expensive and more satisfactory manner than has previously been known.

The desirability of cushioning a clutch drive, particularly in an automobile, to lessen the driving shocks and reduce noise and vibration, has long been realized, and various built-up structures involving the use of rubber or rubberized fabric and sometimes metal springs have been devised for this purpose, but all such prior devices have been objectionable in one or more particulars the principal ones of which are their relatively high cost and lack of durability. My present invention overcomes these objections.

Of the accompanying drawing, Fig. 1 is a side elevation showing a clutch disk or plate embodying my invention.

Fig. 2 is an edge view thereof.

Fig. 3 is a section on the line 3—3 of Fig. 1.

Fig. 4 is a fragmental side elevation showing a modification.

Fig. 5 is a section on the line 5—5 of Fig. 4.

Fig. 6 is a face view of the clip and portion of one spoke in this modification.

Referring at first to Figs. 1, 2 and 3, the circular plate or disk designated as a whole by the numeral 10 is a one-piece structure stamped out of sheet metal and adapted for use as the driven disk of a friction clutch.

Said disk comprises first, an inner driven portion or hub portion 11 centrally apertured at 12 for receiving the usual internally-splined hub on the driven shaft, and formed with a concentric series of holes 13 for the passage of the bolts which connect the portion 11 with the flange of said hub; secondly, a concentric outer driving portion or rim 14 punched with rivet holes 15 for attaching the usual friction facing material on both sides of said rim and more or less divided into segments by means of anti-warping, radial slots 16 to compensate for expansion of the rim by frictional heat and to provide some transverse flexibility, and thirdly a connecting series of equally-spaced, circumferentially-flexible and elastic, radial spokes 17 concentrically distributed around the center of the plate and each having its intermediate portion twisted at right-angles to the plane of the plate or sheet by offsetting the edges of said spoke to opposite sides of said plane.

In making the plate 10, I prefer first to produce a plate blank having a series of spoke blanks 17a in the plane of the sheet and a series of apertures 18 located between said spoke blanks and defined by inner and outer concentric edges and by the spoke-blank side edges 17b indicated for two of the spokes in Fig. 1. These spoke blanks and apertures can be formed concurrently with the formation of the circular inner and outer contours of the plate and of the holes 13, 15 and slots 16, during the same stamping or punching operation, between die members of suitable construction, and the twisting of the spoke blanks to finish the spokes 17 could be performed, if desired, as a part of the same operation, in a continuation of the stamping or punching stroke. However, I prefer to twist the spokes in a separate operation or operations, through the progressive sliding and bending action, in opposite directions, on each of the spoke blanks, of a pair of taper-nosed die members, or in any other suitable manner.

A driven clutch plate of the described construction, made of a suitably elastic steel or steel alloy or other metal, is torsionally resilient in its spoke zone, and the spokes will yield or bend to permit a slight relative circumferential movement of the hub or center portion 11 and the rim portion 14, thereby cushioning the clutch drive and reducing vibration and noise incident to the use of circumferentially rigid plates. This relative movement is limited by the fact that the spokes are radially inextensible. The plate is also made slightly resilient in an axial direction by the bending of the spoke roots at either end where they connect with the hub and rim portions 11 and 14, but this resiliency is not so important as the other.

My improved sheet-metal plate being made in one piece or of integral construction, substantially as described, is much simpler and cheaper than prior built-up clutch plates employing separate springs or buffers of rubber, rubberized fabric, metal or other material, it operates without squeaking or rattling and is not subject to loosening or other deterioration through the use of changeable or perishable materials like rubber and fabric.

It will be obvious that the length, width and number of the spokes may be varied as desired.

In some cases they could be more numerous and smaller in both length and breadth than here shown and two or more of these driven disks could be used in the same clutch, according to the torque duty and other factors in the particular use for which the disk is intended.

Where it is desired to introduce a damping effect to prevent chattering or for other reasons I prefer to laminate the clutch disk and to hold the spoke laminations in sliding frictional contact as embodied in the modified construction illustrated in Figs. 4, 5 and 6 or in any suitable variation thereof. In this case two substantially duplicate clutch plates 10 of the same construction as previously described but made of sheet metal of approximately half the thickness are placed in face to face contact and their corresponding portions are registered with each other. This brings the laminations 17c of the several spokes 17 in frictional contact and they are so held by means of individual tight-fitting, U-shaped spring clips 19, the jaws of which are sprung apart to receive and embrace the spoke laminations and are retained thereon by means of pairs of complementary interfitting projections and indentations 20, 21 on the clip jaws and the spoke laminations respectively. In the use of this modification the relative circumferential movement of the inner and outer portions 11 and 14 produces a slight sliding movement of the spoke laminations on each other, as in the leaves of a laminated spring, and the friction serves to dampen this movement and check the recoil of the rim when slipping occurs during engagement of the clutch, so as to avoid chattering.

My invention may also be modified in other ways within the scope of the claims.

I claim:

1. A torsionally resilient, sheet-metal clutch plate having concentric outer and inner driving and driven portions, and radially inextensible spokes, flexible in the plane of the plate, connecting said portions.

2. A one-piece clutch plate formed with inner and outer continuous rim portions and circumferentially flexible, radially inextensible spokes connecting said portions.

3. A sheet-metal clutch plate formed with hub and rim portions and integral, elastic, radially inextensible connecting spokes twisted substantially at right angles out of the plane of the sheet.

4. A sheet-metal clutch plate formed with radially-extending circumferentially flexible and radially inextensible spokes positioned transversely of the plane of the sheet.

5. A sheet-metal clutch disk comprising hub and rim portions relatively displaceable circumferentially, and a series of integral, circumferentially elastic inextensible radial spokes connecting said portions and twisted across the plane of the disk.

6. A sheet-metal clutch plate formed with spokes each of which has a circumferentially flexible, radial, inextensible body portion standing in a plane substantially at right angles to the general plane of the plate, with its two edges offset in opposite directions from said general plane.

7. A one-piece, sheet-metal clutch plate comprising concentric hub and rim portions and a series of integral, circumferentially flexible, radial, inextensible spokes connecting said portions and each having its two edges offset on opposite sides of the plane of the sheet.

8. A laminated, torsionally-resilient, metal clutch disk.

9. A clutch disk having laminated circumferentially flexible metallic spokes held in frictional contact.

10. A laminated clutch disk comprising a pair of plates formed with circumferentially flexible spokes whose laminations are in sliding frictional contact.

11. A laminated clutch disk comprising a plurality of sheet-metal plates formed with integral, flexible spokes twisted across the plane of the disk and each having slidable laminations in frictional contact.

12. A laminated clutch disk comprising duplicate sheet-metal, one-piece, twisted-spoke plates having spoke laminations held in sliding frictional contact.

13. A laminated, twisted-spoke clutch disk, and means holding the spoke laminations in frictional, sliding contact.

14. A laminated clutch disk comprising a pair of sheet-metal plates formed with resilient spokes twisted across the plane of the disk, and U-shaped clips holding the spoke laminations in sliding, frictional contact.

THOMAS L. FAWICK.